United States Patent
Steeby et al.

(10) Patent No.: US 8,870,714 B2
(45) Date of Patent: Oct. 28, 2014

(54) TRANSMISSION WITH RANGE ENGAGEMENT ASSURANCE

(75) Inventors: Jon Allen Steeby, Schoolcraft, MI (US); Marcel Amsallen, Augusta, MI (US)

(73) Assignee: Eaton Corporation, Cleveland, OH (US)

( * ) Notice: Subject to any disclaimer, the term of this patent is extended or adjusted under 35 U.S.C. 154(b) by 237 days.

(21) Appl. No.: 13/613,898

(22) Filed: Sep. 13, 2012

(65) Prior Publication Data

US 2013/0157809 A1 Jun. 20, 2013

Related U.S. Application Data

(60) Provisional application No. 61/577,619, filed on Dec. 19, 2011.

(51) Int. Cl.
*F16H 61/70* (2006.01)
(52) U.S. Cl.
USPC .......................................... 477/124; 477/908
(58) Field of Classification Search
CPC ........................................................ F16H 61/08
USPC .................................................. 477/908, 124
See application file for complete search history.

(56) References Cited

U.S. PATENT DOCUMENTS

| 4,873,881 | A | | 10/1989 | Edelen et al. |
| 5,508,916 | A | * | 4/1996 | Markyvech et al. ............ 701/51 |
| 5,650,932 | A | * | 7/1997 | Chan et al. ..................... 701/62 |
| 7,861,612 | B2 | | 1/2011 | Jeng et al. |

* cited by examiner

*Primary Examiner* — Sherry Estremsky
(74) *Attorney, Agent, or Firm* — Brooks Kushman P.C.

(57) ABSTRACT

An auxiliary transmission module has an auxiliary transmission having an input shaft, an output shaft, and a mechanical synchronizer, and a controller. The controller is configured to command a downshift for the auxiliary transmission, control the input shaft to a generally synchronous speed with the output shaft for engagement, and increment the speed of the input shaft by a predetermined speed differential above the speed of the output shaft or engagement if the auxiliary transmission is unengaged after controlling to the generally synchronous speed. A method of downshifting includes commanding a downshift for the auxiliary transmission, controlling an input shaft to a generally synchronous speed with an output shaft for engagement, comparing a rotational speed upstream with a rotational speed downstream to verify engagement, and controlling the input shaft to an asynchronous speed with the output shaft for engagement during a recycle event when it is unverified.

20 Claims, 4 Drawing Sheets

TRANSMISSION WITH RANGE ENGAGEMENT ASSURANCE

CROSS-REFERENCE TO RELATED APPLICATIONS

This application claims the benefit of U.S. provisional Application No. 61/577,619 filed Dec. 19, 2011, the disclosure of which is incorporated in its entirety by reference herein.

TECHNICAL FIELD

The technical field is generally control systems for automated shifting of compound transmissions having both a main section and a range section, and particularly, coordinating shifting of the main section of the transmission with the shifting of the range section of the transmission.

BACKGROUND

Compound transmissions of the range type are well known in the prior art. Such transmissions typically comprise a multiple speed main transmission section connected in series with a range type auxiliary section wherein the range step is commonly greater than the total ratio coverage of the main transmission section.

In automated compound transmissions, the main section is typically shifted by means of an automated actuator responsive to an electronic control unit. The electronic control unit may be integrated into a control unit which operates a plurality of vehicle systems, such as the vehicle engine and the vehicle transmission, or may be a discrete and purpose-specific transmission electronic control unit ("TECU"). The control unit will be generically identified herein as a TECU. The automatic actuator of the main section may be an electric X-Y shifter of the type well known in the art, and described in U.S. Pat. No. 4,873,881, which is hereby incorporated by reference. The automatic main section actuator may alternatively be a pneumatically operated mechanism that is also well known in the art. An automatic range section actuator is responsive to control signals from the TECU. An exemplary range section actuator is shown in U.S. Pat. No. 7,861,612 which is hereby incorporated by reference. The actuator described therein is a pneumatic actuator responsive to electrical signals. Although the source of electrical signals described in U.S. Pat. No. 7,861,612 is an operator controlled switch, the range section actuator could alternatively be responsive to an electrical signal from the TECU. Yet alternatively, the range section actuator could be responsive to a switch controlled by the TECU. The precise mechanisms and configurations thereof used to shift the main transmission section and the range transmission section is not intended to be limiting to scope of application of the present invention.

A common arrangement for a transmission has a plurality of gear ratios available for selection in the main section perhaps five for example, and two gear ratios, characterized as "High" and "Low" provided by the range section. The High range is commonly characterized as "direct" in which the output member of the range section rotates as a unit with the input member. With the range section in the Low range, the output member rotates at a lower speed than the input member, and provides a torque-multiplying effect.

The particular concern addressed by this invention relates to coordinating shifting of the main section and the range section and ensuring engagement of the range section. More specifically, it is intended to facilitate shifting the range section from High to Low in an off-throttle condition, as might be desirable to achieve engine braking when operating a vehicle on a downhill grade. A number of factors relating to the interplay of the mechanical components can contribute to making it difficult to complete such a shift.

It is desired to provide a control system which facilitates the completion of off-throttle range shifts from High into Low.

SUMMARY

In an embodiment, a method of downshifting an auxiliary transmission having a mechanical synchronizer is provided. A downshift is commanded for the auxiliary transmission. An input shaft of the auxiliary transmission is controlled to a generally synchronous speed with an output shaft of the auxiliary transmission to engage the auxiliary transmission. A rotational speed upstream of the auxiliary transmission is compared with a rotational speed downstream of the transmission to verify engagement. The input shaft of the auxiliary transmission is controlled to an asynchronous speed with the output shaft of the auxiliary transmission to engage the auxiliary transmission during a recycle event when engagement is unverified.

In another embodiment, an auxiliary transmission module is provided with an auxiliary transmission and a controller in communication with the auxiliary transmission. The auxiliary transmission has an input shaft, an output shaft, and a mechanical synchronizer. The controller is configured to (i) command a downshift for the auxiliary transmission, (ii) control the input shaft to a generally synchronous speed with the output shaft to engage the auxiliary transmission, and (iii) increment the speed of the input shaft by a predetermined speed differential above the speed of the output shaft to engage the auxiliary transmission if the auxiliary transmission is unengaged after controlling the input shaft to the generally synchronous speed.

In yet another embodiment, a transmission is provided with a main transmission section, an auxiliary range transmission section downstream of the main transmission and connected to the main transmission section by a mainshaft, and a controller. The controller is configured to (i) command a downshift for the auxiliary transmission, (ii) control the mainshaft to a generally synchronous speed with the output shaft of the auxiliary transmission section to engage the auxiliary transmission, (iii) verify engagement of the auxiliary transmission, and (iv) increase the speed of the mainshaft by a predetermined speed differential above the speed of the output shaft to engage the auxiliary transmission if engagement is unverified.

Various embodiments of the present disclosure have associated advantages. For example, a range selection control system for a multispeed compound transmission facilitates the completion of shifts from High to Low. In the case of a range downshift, the speed of a mainshaft of the main section is increased to provide a pre-determined speed difference between the mainshaft and the output shaft for the new range gear ratio and a generally synchronous speed within the range synchronizer section. The speed differential between the mainshaft and output shaft may be incremented by raising the mainshaft speed to cause an asynchronous speed across the range synchronizer section, until full engagement is achieved within the range section. For a transmission with a mechanical synchronizer in the range section, causing an asynchronized speed across the range synchronizer section pulls the range section off blocker pins or other mechanical engagement members and causes the range section to slide into engagement in the desired range gear after a shift, such as a downshift.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
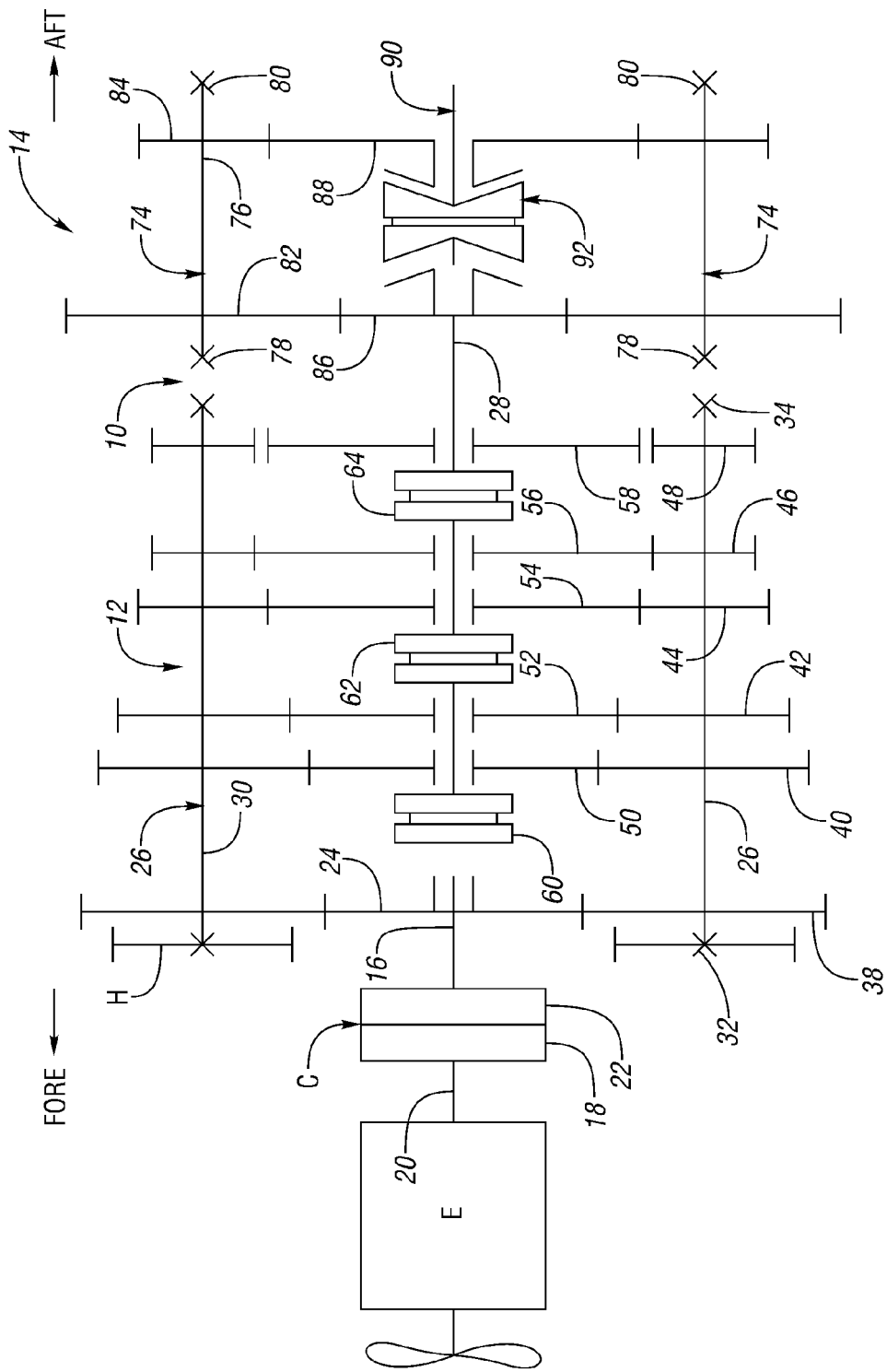
FIG. 1 is a schematic illustration, not to scale, of a compound transmission having a range type auxiliary section.

Referring to FIG. 1, a range type compound transmission 10 is illustrated. Compound transmission 10 comprises a multiple speed main transmission section 12, or more concisely, main section 12, connected in series with a range type auxiliary section 14, or more concisely range section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main section 12, input shaft 16 carries an input gear 24 for simultaneously driving a pair of countershaft assemblies 26 at substantially identical rotational speeds. The two countershaft assemblies 26, which may be substantially identical, are illustrated on diametrically opposite sides of a mainshaft 28 which is generally coaxially aligned with input shaft 16. Each of countershaft assemblies 26 comprises a countershaft 30 supported by bearings 32 and 34 in the housing. Each of countershaft assemblies 26 is provided with a grouping of countershaft gears 38, 40, 42, 44, 46 and 48, fixed for rotation therewith. A plurality of mainshaft gears 50, 52, 54, 56 and 58 surround mainshaft 28 and are selectively clutchable, one at a time, to mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Mainshaft gear 58 is the reverse gear and is in continuous meshing engagement with countershaft gears 48 by means of conventional intermediate idler gears (not shown). It should also be noted that while main section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions, and is not usually utilized in the high transmission range. Accordingly, while main section 12 does provide five forward speeds, it is usually referred to as a "four plus one" main section as only four of the forward speeds are compounded by the range section 14 utilized therewith. It is appreciated that the configuration of main section 12 described above is exemplary and is not critical to the present invention.

With continued reference to FIG. 1, range section 14 includes two substantially identical range countershaft assemblies 74 each comprising a range countershaft 76 supported by bearings 78 and 80 in housing H and carrying two range countershaft gears 82 and 84 for rotation therewith. Range countershaft gears 82 are constantly meshed with and support a range input/main section output gear 86 that is fixed to mainshaft 28. Range section countershaft gears 84 are constantly meshed with a range section output gear 88 that surrounds transmission output shaft 90.

Figure 2:
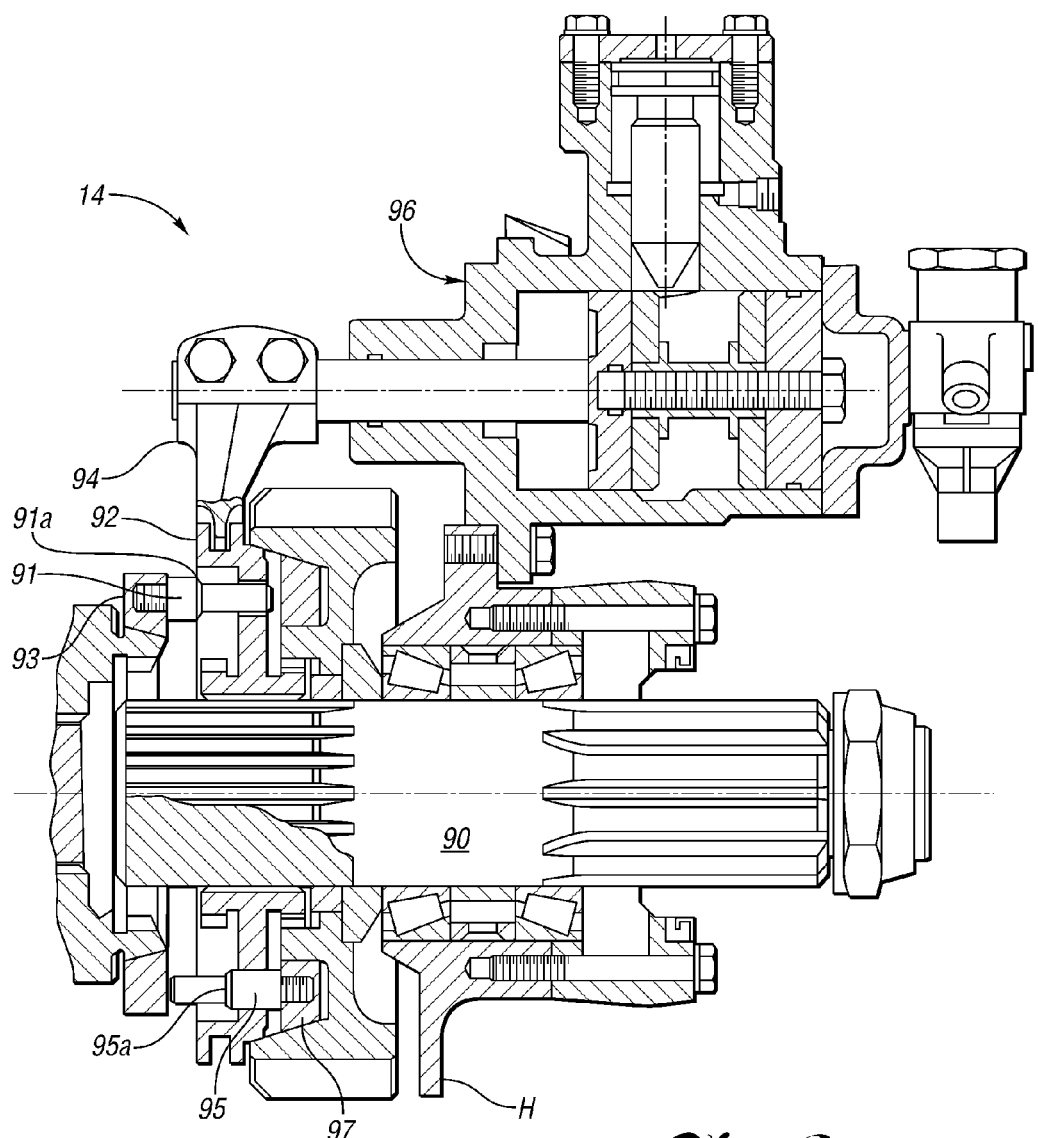
FIG. 2 is a sectional view of an exemplary range section and a range section actuator as might be used as part of the transmission of FIG. 1.

With reference to FIGS. 1 and 2, range section 14 further includes a synchronized two-position range jaw clutch assembly 92. Jaw clutch assembly 92 is axially positioned by means of a range shift fork 94 (illustrated in FIG. 2). Jaw clutch assembly 92 is rotatably fixed to output shaft 90 for rotation therewith. A range section shifting actuator assembly 96, or more concisely, a range actuator 96, is provided for clutching either gear 88 to output shaft 90 for low range operation, or gear 86 and mainshaft 28 to output shaft 90 for direct or high range operation of the compound transmission 10.

Although range section 14 is illustrated as a two-speed section which may utilize spur or helical type gearing, it is understood that the embodiments presented herein are also applicable to range type transmissions utilizing combined splitter/range type auxiliary sections, having three or more selectable range ratios and/or utilizing planetary type gearing. Also, as indicated above, any one or more of clutch collars 60, 62 or 64 may be of the synchronized jaw clutch type and transmission sections 12 and/or 14 may be of the single countershaft type.

With reference to this disclosure, when two rotating members of the transmission 14 are at a synchronous speed with one another, it includes any speed difference between them caused by a gear ratio. For example, if there is a 4:1 gear ratio between a first and second shaft and the first shaft is rotating at 1000 rpm, the second shaft would be rotating at 250 rpm and be synchronous with the first shaft.

With reference to FIG. 1, the shifting of gears in the main section 12 will be described in greater detail. Typically, clutch collars 60, 62 and 64 are axially positioned by means of shift forks or other collar displacement means (not shown). Clutch collars 60, 62 and 64 may be of the well known synchronized or nonsynchronized double acting jaw clutch type.

Clutch collars 60, 62, and 64 are three-position clutches in that they may be positioned, as illustrated in FIG. 1, in the centered nonengaged position, in a fore engaged position or in an aft engaged position by means of the collar displacement means. The collar displacement means are actuated by an automated selector mechanism (not shown) fixed relative to or incorporated into housing H and responsive to control signals from the TECU. Only one of the clutch collars 60, 62 and 64 is engageable at a given time, and a main section interlock means (not shown) may be provided to lock the other clutches in the neutral condition. The TECU provides signals to the automated selector mechanism to shift main section 12. The TECU manipulates a switch 98 to shift range section 14. Switch 98 may be mounted anywhere it is convenient for packaging purposes, including locations remote from transmission 10. Initiation of range shifting is generally permitted only when main section 12 is in neutral.

The overall transmission ratio between the speed of rotation of input shaft 16 and output shaft 90 is determined by a combination of the gear selected in main section 12 and the gear selected in range section 14.

FIG. 2 illustrates an embodiment of the synchronized two-position range jaw clutch assembly 92. The two-position range jaw clutch assembly 92 is a sliding clutch rotatably fixed to output shaft 90 using splines and configured to slide longitudinally along the shaft 90 as controlled using the shift fork 94. When the range section 14 is in the high range position, a high synchronization assembly 93 is engaged with clutch assembly 92. Synchronization assembly 93 is connected for rotation with the mainshaft 28. The synchronization assembly 93 has blocking pins 91 that engage with apertures in the clutch assembly 92, thereby selectively connecting mainshaft 28 to the output shaft 90.

When the range section 14 is in the low range position, a low synchronization assembly 97 is engaged with clutch assembly 92, as shown in FIG. 2 with the larger diameter portion of pin 95 engaged with assembly 92. Synchronization assembly 97 is connected for rotation with the range section output gear 88. The synchronization assembly 97 has blocking pins 95 that engage with apertures in the clutch assembly 92, thereby connecting mainshaft 28 to the output shaft 90 via the range section 14 gearing. Traditionally, during a downshift in the range section 14, synchronizing frictional material in the assembly 97 transfers energy between rotating members to cause the jaw clutch and mainshaft to rotate at a generally synchronous speed with the output shaft. As the speed becomes synchronous, the force created between the angled portion 95a of the blocking pins 95 and the assembly 92 decreases and enables the assembly 92 to slide onto the larger diameter portion of the blocker pins, engage the clutch and complete the shift.

Figure 3:
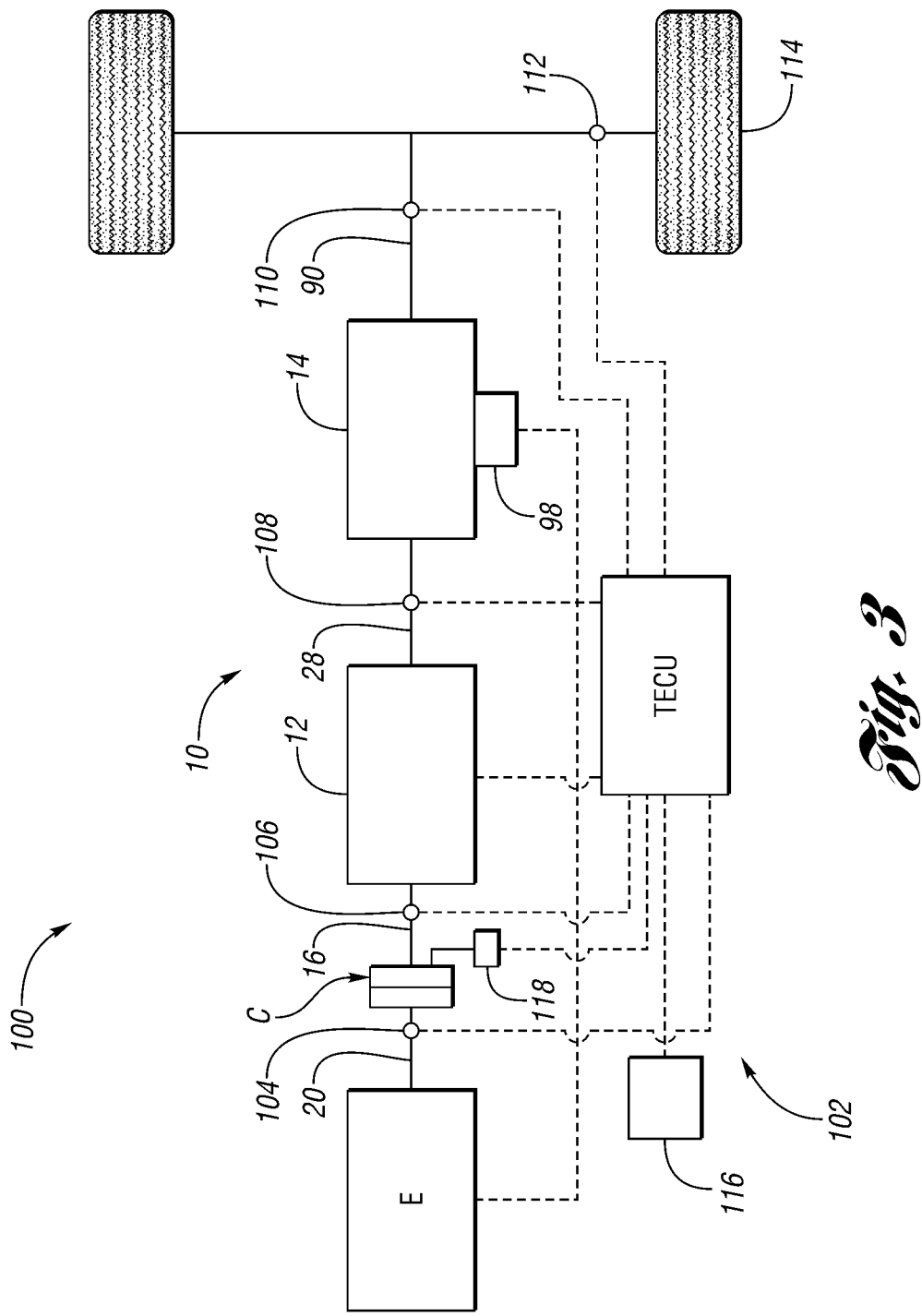
FIG. 3 is a schematic of the control element elements associated with the transmission of FIG. 1.

FIG. 3 is a schematic representation of a powertrain system 100 incorporating transmission 10 and a powertrain control system 102. Control system 100 includes several rotary speed sensors which may be mounted in a manner suited to determining the rotational speed of predetermined rotating members of the powertrain system. Exemplary rotary speed sensors include an engine speed sensor 104, a transmission input shaft speed sensor 106, a mainshaft speed sensor 108, an output shaft speed sensor 110, and a wheel speed sensor 112 associated which a wheel 114. Any combination of sensors that will provide an indication of the ratio across range section 14 will be sufficient. It may be possible to use signals indicative of rotational speed that are already available in the system. Control system 102 also includes a vehicle operator transmission control interface commonly characterized as a shifter 116. Shifter 116 enables the vehicle operator to establish the mode of operation of the transmission. Commonly available modes include Reverse, Neutral, and Drive. The form of the shifter is not important to the present invention. FIG. 3 includes dotted lines representing control signal paths electrically, by wire or wirelessly, connecting TECU with sensors, a clutch actuator 118, shifter 116, transmission main section 12, transmission range section 14 and switch 98 and engine E.

An exemplary compound downshift is now described. With a compound downshift, ratio changes are being made in both the main section 12 and in the range section 14. The exemplary target gear combination of main section and range section yields a drive ratio resulting in a greater engine speed at a given vehicle speed compare to that associated with the gear being shifted from. Assuming a constant vehicle speed, engine speed will be greater after the downshift than before. Main section 12 is initially in what is characterized herein as Sixth Gear, with collar 64, given the orientation of FIG. 1, in a fore-most position and fixing gear 56 to mainshaft 28 for unitary rotation therewith. Alternatively, what is characterized as Sixth Gear could have collar 64 in a neutral position, and collar 62 in the aft-most position, fixing gear 54 to mainshaft 28. The distinction is not critical to the invention. Range section 14 is in High, with jaw clutch assembly 92, in the orientation of FIG. 1, in a fore-most position and fixing output shaft 90 to mainshaft 28 for unitary rotation therewith.

The target gear is characterized as Fifth Gear for purposes of this example. For this exemplary Fifth Gear, collar 60 is displaced in the fore direction to connect mainshaft 28 to input shaft 16 for unitary rotation therewith. The range section has jaw clutch 93 in an aft-most position, wherein torque is transferred from mainshaft 28 to output shaft 90 through gears 86 and 82 and gears 84 and 88.

The invention is directed to a means of achieving a downshift, such as a shift from Sixth Gear to Fifth Gear.

In an automated transmission, downshifts can be induced by control software installed in the TECU, or by input from the vehicle operator. The invention is intended to aid in downshifts, independent of the source of the command to downshift. In one example, a vehicle operator may wish to downshift on a grade to enable slowing of the vehicle through engine braking Downshifting will result in an increase in engine speed, which, when combined with zero throttle or little or no demand for engine torque results in increased engine resistance to vehicle movement, or engine braking.

Figure 4:
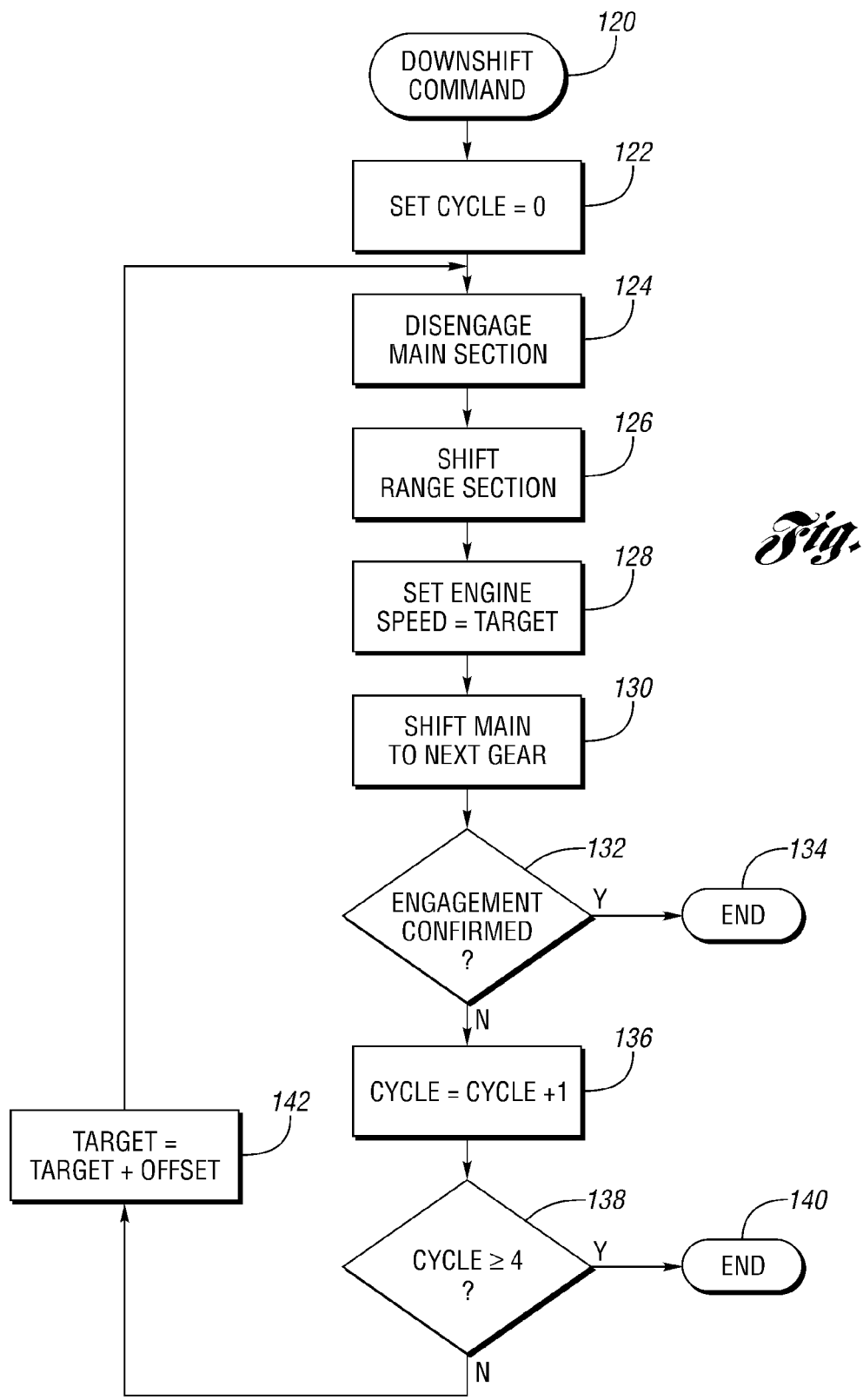
FIG. 4 is an exemplary flow chart of one form of the logic employed in the present invention.

FIG. 4 illustrates an exemplary flow chart for one implementation of the invention. In the example described below with reference to FIG. 4, the offset is 15 rpm with the Target speed being establish by the TECU as a function of the target gear ratio and the vehicle speed. Of course, the offset may be set to other rpm values with the same effect. It should also be appreciated that, in accord with the disclosure, the limit on the number of cycles could be set to more or fewer than four. The described approach to downshifting is particularly effective for use with closed-clutch shifts in which clutch C remains engaged throughout the shift.

The TECU receives a command to downshift at 120 and sets a cycle counter to zero at 122.

As a first step at 124, the main section is disengaged with collar 64 moved to a neutral position where it engages neither gear 56 nor 58. As a second step at 126, range jaw clutch 92 is moved to an aft position in an effort to achieve full engagement with gear 88, or the range section is commanded to shift.

As a third step at 128, the TECU commands engine E to rotate at a synchronous speed with the expected speed of mainshaft 28, given the vehicle speed and presuming the engagement of clutch 92 and gear 88 has been successful. The main section is shifted into another gear at 130, such as by moving collar 60 to a fore position to rotatably fix input shaft 16 and mainshaft 28. As the speed of the mainshaft 28 increases such that the speed within the range synchronizer becomes synchronized, the clutch assembly 92 may engage and complete its shift as discussed above with respect to FIG. 2. The TECU compares the ratio of signals from sensors 110 and 108 to determine if the ratio of the rotational speeds is consistent with the gear ratio of range section 14 in the Low condition at 132. If it is, then the downshift was successful, the process proceeds to 134, and there is no need for any attempted recycling of the transmission.

However, if the downshift was not successful, then the clutch assembly 92 could not complete the shift to engagement. For the clutch assembly 92 as shown in FIG. 2, the blocker pins are preventing engagement of the jaw clutch based on forces on the angles faces of the blocker pins. For an incomplete downshift, another attempt must be made to engage the clutch assembly 92 and the process proceeds to 136.

At 136, the TECU increments the cycle counter, and then determines if more than a specified number of cycles have been run by the TECU at 138. If more than the specified number of cycles have been run, such as four cycles, the TECU proceeds to 140 and exits the algorithm. The TECU may set a fault code or set a flag as an input into another transmission operating algorithm.

If less than the specified number of cycles have been run, the TECU proceeds to 142 and increments the target speed by an offset value to set a new target speed value. For example, the offset may be 15 rpm, such that the new target speed is 15 rpm higher than the previous rpm speed.

The TECU then returns to 124 for recycling the system. The first step in recycling the system is to place the main section in neutral again at 124, and the put the range section back in the High condition with the jaw clutch in the fully fore position. The range section is then cycled back toward the Low condition with the jaw clutch in the aft position at 126. The main section 12 is shifted back into its target gear at 130, and engagement confirmed or not confirmed by the values from the speed sensors. In the prior art, the attempt to complete the shift would be made by setting the engine speed to the same speed as was used on the first cycle. Instead, in the inventive approach, the speed of the engine is set to rotate at 15 revolutions per minute (rpm) faster, causing the target gear in the main section to rotate faster than the precise synchronous speed at 128 using the new target speed from 142. It is critical that the newly targeted speed is greater than synchronous. It has been found that engaging the target gear in the main section at a slightly elevated asynchronous speed has the beneficial effect of encouraging the jaw clutch 92 in the range section to complete its engagement on a downshift because the asynchronous speed allows the synchronizer to "pull off" from the angled portion of the blocker pins and engage with the wider diameter portion of the blocker pins. It is appreciated that the value of 15 rpm can be varied without departing from the scope of the present invention. The primary upper limit is established by the presence of excessive gear tooth chatter during engagement in the main section 12.

In a variation of this invention, in the event that the first recycle event is does not result in a successful engagement, engine speed is adjusted in a second recycle event to a higher speed. In this exemplary embodiment, the engine speed is set to provide a 30 rpm difference in speed, and a new recycle attempt made.

In another variation of this invention, in the event that the second recycle event is does not result in a successful engagement, engine speed is adjusted in a second recycle event to a higher speed. In this exemplary embodiment, the engine speed is set to provide a 45 rpm difference in speed, and a new recycle attempt made.

It is apparent that number of steps or the size of the steps is not critical to the present invention. The steps also need not be uniform in size. The size and number of steps will depend on the characteristics of the transmission itself.

A surprising result is that increasing the engine speed would promote slowing of the vehicle. It is counterintuitive to increase engine speed in a circumstance where the vehicle operator is likely trying to slow the vehicle. Increasing engine speed has the effect of increasing vehicle speed momentarily when the desired effect of downshifting in a zero throttle condition is typically to slow the vehicle. However, it has been determined that a very brief surge in torque on gear engagement is more acceptable than an extended period of gear disengagement with the associated period of having no engine braking at all. The offset may be limited as too high of an offset may cause an undesirable torque surge for the vehicle during engagement, which may decrease shift quality for a vehicle in a low or no acceleration downshift.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of downshifting an auxiliary transmission having a mechanical synchronizer, the method comprising:
   commanding a downshift for the auxiliary transmission;
   controlling an input shaft of the auxiliary transmission to a generally synchronous speed with an output shaft of the auxiliary transmission to engage the auxiliary transmission;
   comparing a rotational speed upstream of the auxiliary transmission with a rotational speed downstream of the transmission to verify engagement; and
   controlling the input shaft of the auxiliary transmission to an asynchronous speed with the output shaft of the auxiliary transmission to engage the auxiliary transmission during a recycle event when engagement is unverified.

2. The method of claim 1 wherein the asynchronous speed is provided by rotating the input shaft at a predetermined speed differential faster than the output shaft.

3. The method of claim 2 further comprising incrementing the asynchronous speed with the speed differential during another recycle event to engage the auxiliary transmission.

4. The method of claim 2 wherein the predetermined speed differential is fifteen revolutions per minute.

5. The method of claim 1 further comprising controlling an engine speed to control the speed of the input shaft to the auxiliary transmission.

6. The method of claim 1 further comprising downshifting a main transmission upstream of the auxiliary transmission.

7. The method of claim 1 further comprising shifting the auxiliary transmission while a main transmission upstream of the auxiliary transmission is in neutral.

8. The method of claim 1 further comprising receiving an entry condition of near zero throttle.

9. The method of claim 1 further comprising receiving an entry condition of an engine torque demand being zero or less.

10. An auxiliary transmission module comprising:
    an auxiliary transmission having an input shaft, an output shaft, and a mechanical synchronizer; and
    a controller in communication with the auxiliary transmission and configured to (i) command a downshift for the auxiliary transmission, (ii) control the input shaft to a generally synchronous speed with the output shaft to engage the auxiliary transmission, and (iii) increment the speed of the input shaft by a predetermined speed differential above the speed of the output shaft to engage the auxiliary transmission if the auxiliary transmission is unengaged after controlling the input shaft to the generally synchronous speed.

11. The auxiliary transmission module of claim 10 further comprising:
    a first speed sensor upstream of the auxiliary transmission; and a second speed sensor downstream of the auxiliary transmission;

wherein the controller is configured is configured to determine engagement of the auxiliary transmission by comparing data from the first and second speed sensors.

12. The auxiliary transmission module of claim 11 wherein the first speed sensor is configured to measure the rotational speed of the input shaft.

13. The auxiliary transmission module of claim 11 wherein the second speed sensor is configured to measure the rotational speed of the output shaft.

14. The auxiliary transmission module of claim 10 wherein the auxiliary transmission is a two speed transmission.

15. The auxiliary transmission of claim 10 wherein the mechanical synchronizer comprises a range jaw clutch assembly.

16. A transmission comprising:
a main transmission section;
an auxiliary range transmission section downstream of the main transmission and connected to the main transmission section by a mainshaft; and
a controller configured to (i) command a downshift for the auxiliary transmission, (ii) control the mainshaft to a generally synchronous speed with the output shaft of the auxiliary transmission section to engage the auxiliary transmission, (iii) verify engagement of the auxiliary transmission, and (iv) increase the speed of the mainshaft by a predetermined speed differential above the speed of the output shaft to engage the auxiliary transmission if engagement is unverified.

17. The transmission of claim 16 wherein the auxiliary range section comprises a mechanical synchronizer.

18. The transmission of claim 16 wherein the auxiliary range section comprises an automatic range section actuator.

19. The method of claim 16 wherein the controller is configured to increase an engine speed to increase the speed of the mainshaft during downshifting.

20. The method of claim 16 wherein the controller is configured to command the downshift for the auxiliary transmission in response to receiving an engine torque demand of zero or less.

* * * * *

UNITED STATES PATENT AND TRADEMARK OFFICE
CERTIFICATE OF CORRECTION

| | | |
|---|---|---|
| PATENT NO. | : 8,870,714 B2 | Page 1 of 1 |
| APPLICATION NO. | : 13/613898 | |
| DATED | : October 28, 2014 | |
| INVENTOR(S) | : Jon A. Steeby et al. | |

It is certified that error appears in the above-identified patent and that said Letters Patent is hereby corrected as shown below:

In the Claims

Column 9, Line 3, Claim 11:

After "wherein the controller is configured"
Delete "is configured" (second instance).

Signed and Sealed this
Seventeenth Day of February, 2015

Michelle K. Lee
*Deputy Director of the United States Patent and Trademark Office*